Figure 1:
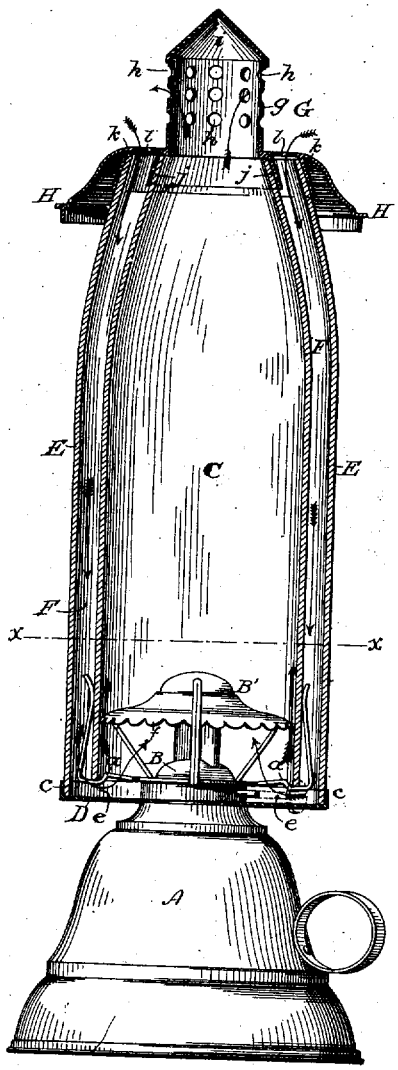

W. S. BLAISDELL & C. K. YOUNG,

Assignors to J. T. MERCER & A. L. BARON.

Lamp.

No. 8,732. Reissued June 3, 1879.

*Witnesses:*

C. Clarence Poole

L. W. Serrell

*Inventor:*

William S. Blaisdell

Charles K. Young by Geo. W. Myers

Atty.

N. PETERS, PHOTO-LITHOGRAPHER, WASHINGTON, D. C.

UNITED STATES PATENT OFFICE.

WILLIAM S. BLAISDELL AND CHARLES K. YOUNG, OF FACTORY POINT, VERMONT, ASSIGNORS TO JOHN T. MERCER AND ALFRED L. BARON, OF BELLAIRE, OHIO.

IMPROVEMENT IN LAMPS.

Specification forming part of Letters Patent No. 142,432, dated September 2, 1873; Reissue No. 8,732, dated June 3, 1879; application filed December 3, 1878.

*To all whom it may concern:*

Be it known that we, WILLIAM S. BLAISDELL and CHARLES K. YOUNG, of Factory Point, in the county of Bennington and State of Vermont, have invented an Improvement in Lamps and Lanterns, of which the following is a specification.

Prior to the invention of said BLAISDELL and YOUNG many improvements in lamps and lanterns for burning kerosene-oil had been patented. Among these were lamps and lanterns having no glass chimney or globe, other lamps or lanterns having a single chimney or single globe, and other lamps and lanterns having a large globe and an ordinary glass chimney. In the greater portion of these lamps or lanterns air to feed and support combustion was taken wholly from the base, and in a small portion was taken partly from the base and partly from the top of the lamp or lantern; but no instance is known or believed to exist prior to the said invention of BLAISDELL and YOUNG where all the air which was admitted into the flame-chamber of a kerosene lamp or lantern was admitted from the top of the same. In lamps or lanterns without chimneys or globes the combustion was attended with more or less smoke in the house, and such lamps or lanterns were unfit for outdoor use, as the light was easily extinguished by air-currents. In lamps or lanterns with a single glass chimney or globe, on account of the intense heat created in the flame-chamber, being the interior of such chimney or globe, such chimneys or globes were liable constantly to breakage, particularly in wet or frosty weather, or whenever water fell upon their outsides. In lamps or lanterns having a glass chimney within a large globe there had been a failure of perfect operation from some cause, and such lamps or lanterns had not been successfully used. In all of these lamps and lanterns there had been no single one which had a perfect combustion as well indoors as out-of-doors, and was equally well adapted for use as a lamp or a lantern.

The object of the invention of said BLAISDELL and YOUNG was to make a coal-oil lamp or lantern capable of either or both uses, and of such construction that it would have perfect combustion, whether in the house or out-of-doors, and wherein there would be no breakage of chimneys; and their invention consisted in employing two chimneys of substantially the same form, one adapted to be placed within the other, so as to leave an air-space between the two at all points, the chimney proper, or a metallic chimney which is a continuation of it, extending above the top of the outer chimney, with outlets at the top for the escape of the products of combustion, and the space between the chimneys having at its top inlets, through which all the air which feeds and supports combustion enters, the inner chimney being supported at its bottom a little distance above the outer globe, so that the air which enters at the top and passes down in the space between the chimneys passes under the bottom of the inner chimney and into the flame-chamber within the chimney, and the outer chimney resting upon a close base without any air-inlets whatever.

The invention also consists in the cap which covers the lamp or lantern, and in the various combinations of the several operative parts of the lamp or lantern.

In order that those skilled in the art may know how to make and use our improvement, the same is now more specifically described in connection with the drawings, in which—

Figure 2:
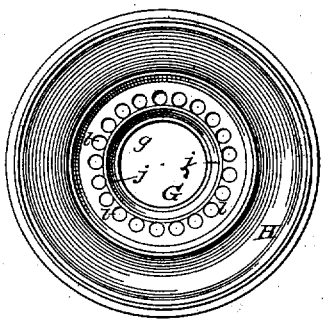
Figure 3:
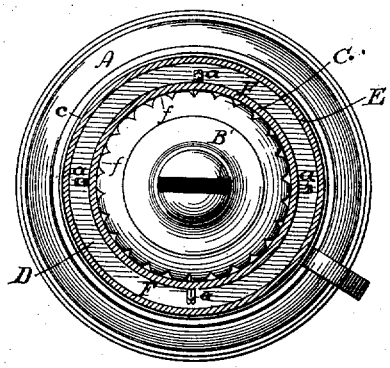
Figure 4:
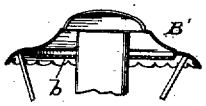
Figure 5:
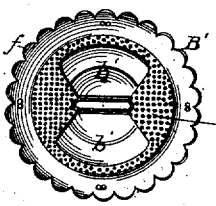

Figure 1 is a vertical section of the portion above the oil-reservoir; Fig. 2, a plan view of the top, looking upward; Fig. 3, a horizontal section on the line *x x*, looking downward. Fig. 4 is a vertical central section of the upper part of the burner, and Fig. 5 is a plan view from below the same.

Like letters denote corresponding parts.

In the drawings, A represents the oil-reservoir. B represents the lower part of the burner, and B′ the upper part. The lower part, B, is secured to the top of the oil-reservoir, and has springing out of it the usual wick-tube. The upper part of the burner, B′, is a dome-shaped cap held by supports, with its center a little above the top of the wick-tube, and has scalloped outer edges. Upon the inside of this cap B′, and secured to the wick-tube a little below its top, is a diaphragm, *b*, with openings *b'* opposite to the broadest part of the wick-tube. The portions of this diaphragm opposite the edges of the wick-tube are pierced with fine perforations.

The chimney C rests upon supports *a a*, and is a cylinder with tapering upper part.

D is the base-plate of the lamp or lantern, and has upturned flanges *c c* at its outer edges, which give support to the outer chimney, E, which fits closely within them, resting upon the base-plate D. This base-plate D, as shown, rests upon the shoulder of the burner-cone B, and when in position has no openings whatever through it by which air might pass into the interior of the lamp or lantern.

The supports *a a*, upon which the chimney C rests, and which are shown as ordinary chimney spring-supports, hold the bottom of the chimney a little distance above the base-plate D, so that there is a free open air-space, *e*, at all points between the bottom of this chimney and the top of the base-plate D. This chimney is also supported on its inside by the cap B' of the burner, the points of whose scalloped edges *f* touch the inner walls of the chimney.

The outer chimney, E, made of suitable transparent material, the bottom of which rests upon the base-plate D, is preferably of the same form as the chimney C, but considerably larger, so that there is between this chimney C and the outer chimney, E, a clear open space, F, everywhere of about substantially the same sectional cross-area, and extending from top to bottom. At the bottom of the lamp or lantern this space F has a clear open communication with the interior of the chimney C or the flame-chamber.

A cap, G, used in this improvement has an upper portion, *g*, of about the same diameter as the top of the chimney C, with numerous outlets *h h* for the escape of the products of combustion, and is surmounted by a conical cover, *i*, a little wider than the portion *g*. A lower portion, *j*, of this cap, flaring a little, gives a firm support to the top of the chimney, which fits closely to it, and serves as a metallic continuation of the same up to the outlets *h h* before named.

An annular flange, *k*, is attached to the cap at or near the top of the part *j*, which flares outwardly and extends far enough to receive and hold firmly the top of the outer chimney, E. In the upper part of this flange *k* are numerous large air-inlets, *l l*, opening directly into the space F between the chimneys.

An ordinary reflector, H, is attached to this cap G. When this improvement is used as a lamp within the house, it is perceived that this cap may be readily removed, and when it is to be used out-of-doors as a lantern the cap G may be as readily replaced.

The operation of this improvement is as follows: When it is used as a lamp with the cap removed, the air which feeds and supports combustion enters the open top of the space F between the chimneys, and is drawn down by exhaust or suction created by combustion in the flame-chamber, under the bottom of the burner-cap B', whence the greater part of it passes up through the openings *b b'* on each side of the wick-tube, and feeds combustion on each side of the flame, insuring a steady white light of great illuminating-power. Other currents of air are drawn up through the openings in the scalloped edges of the cap B', and while they assist, perhaps, in some degree, in supporting combustion, their main office is to cool the walls of the chimney, the heat of which tends to cause said last-named currents in their passage out of the flame-chamber to cling close to such heated walls.

When this lamp is carried about in use it follows that any violence of motion which tends to accelerate the outflow of the heated air from the combustion or flame chamber tends in a like degree to increase the flow of air in the space F, which neutralizes the outflow, and thus the light is preserved in a steady volume under agitation, which result is also assisted by the interposition of the diaphragm *b*, which prevents the passage of more violent currents of air, except through the openings *b' b'*. The space F being constantly supplied with fresh air, and the outside of the outer chimney being constantly exposed to the atmosphere, it follows that this outer chimney is always cool, and will not be cracked or broken by frost or water. The chimney also is kept measurably cool by the air-currents in the space F and by the inner air-currents passing up through the openings in the scalloped edge of the cap B', as before explained.

When this improvement is used as a lantern and the cap G is in position, the operation is substantially the same, so far as relates to the movement of air-currents within the lantern, when the same is in a state of rest in a calm atmosphere, or when it is carried about or agitated in a calm atmosphere. When, however, it is exposed to winds, the same power of wind which will force air into the openings *h h* in the cap G and down into the flame-chamber will also force air into the openings *l l* and into the space F, and thus one force will neutralize the other and a steady light be maintained; and it will follow that the same operation of air-currents would take place if the lantern were swung from side to side.

The advantages of this lamp or lantern may be gathered from the preceding description, and are obvious upon examination.

Having thus described this improvement, its construction, and mode of operation, what is claimed therein as new and the invention of said BLAISDELL and YOUNG is—

1. In a lamp or lantern, the combination of an inner chimney, with a connecting perforated metallic chimney rising above the same, an outer chimney rising to about the same elevation as the inner chimney, an air-space between the two chimneys, and air-feeding openings at the top of said air-space, communicating with a fixed burner, whereby air for combustion is taken directly from the outside through restricted spaces, and the products of combustion escape above said air-feeding inlets through restricted spaces, and the lamp or lantern is enabled to bear agitation or exposure to winds.

2. In a lamp or lantern, the combination of an outer and an inner chimney, a metallic chimney connected with and rising above the chimney, an air-supply space between the chimneys, with openings in the top and open at the bottom, communicating with an air-chamber under the burner, a closed base and a perforated diaphragm under the burner, whereby, in agitations of the lantern or exposure to the winds, an undue supply of air is prevented from entering the burner.

3. In a lamp or lantern, the combination of the outer and inner chimney, the air-feeding space between them, the air-chamber under the burner, a closed base, and the openings around the scalloped edges of the burner-cap, as and for the purpose described.

4. In a lamp or lantern, the combination of an outer and inner chimney and a reflector-cap, which serves to hold the two chimneys in position and protect the outer chimney from exposure to rain or snow, substantially as described.

5. In combination with a lamp or lantern, the removable cap G, adapted to convert a lamp into a lantern, substantially as described.

6. In combination with the two chimneys, the closed base and the removable cap G, with flanges, substantially as described.

WILLIAM S. BLAISDELL.
CHAS. K. YOUNG.

In presence of—
N. S. CLARK,
R. N. DYER.